April 8, 1924.  1,489,266
A. F. MELICHAR ET AL
TIRE RIM TOOL
Filed Sept. 18, 1922  2 Sheets-Sheet 1
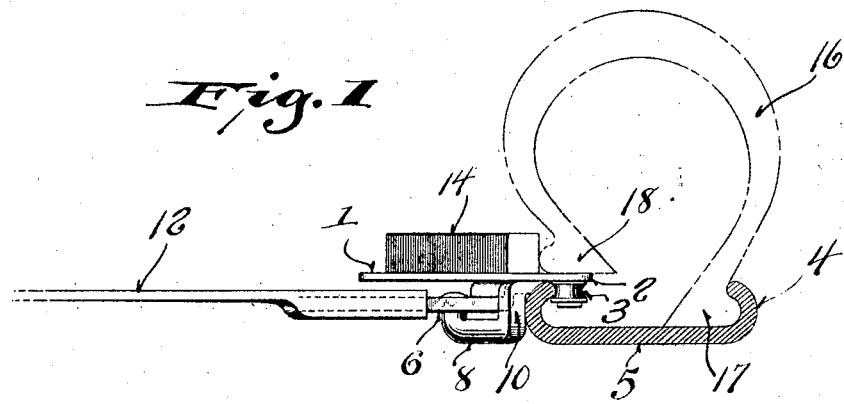
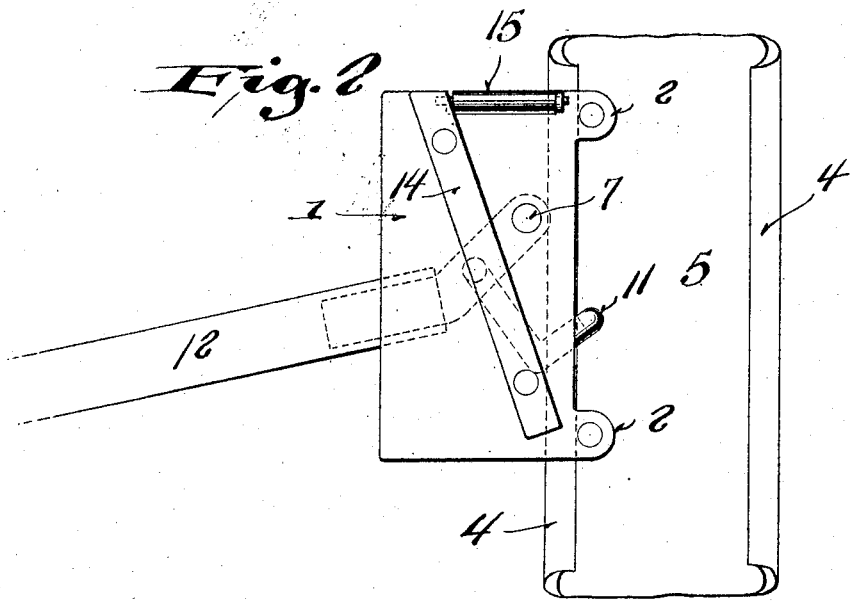

April 8, 1924.

A. F. MELICHAR ET AL 1,489,266

TIRE RIM TOOL

Filed Sept. 18, 1922    2 Sheets-Sheet 2

Patented Apr. 8, 1924.

1,489,266

UNITED STATES PATENT OFFICE.

ANTON F. MELICHAR AND LEO PAETZ, OF DENMARK, WISCONSIN.

TIRE-RIM TOOL.

Application filed September 18, 1922. Serial No. 588,873.

*To all whom it may concern:*

Be it known that we, ANTON F. MELICHAR and LEO PAETZ, both citizens of the United States, and residents of Denmark, in the county of Manitowoc and State of Wisconsin, have invented certain new and useful Improvements in Tire-Rim Tools; and we do hereby declare that the following is a full, clear, and exact description thereof.

This invention relates to tire rim tools and is particularly directed to a device adapted to place clincher tires upon the flanged rims of vehicle wheels.

Objects of this invention are to provide a device for positioning clincher tires upon the flanged rims, which may be easily operated, which will travel along the rim and force the clincher tire into position, which may be manually operated, and which will not injure the tire.

Further objects are to provide a device for positioning tires upon rims, which may be formed in a rugged and substantial manner, which may be cheaply manufactured, which is compact, and which may be operated by an unskilled laborer.

An embodiment of the invention is shown in the accompanying drawings, in which:

Figure 1 is an end elevation of the device, showing a section of the tire and rim.

Figure 2 is a plan view of the device in position upon a rim.

Figure 3 is an edge view of the device looking from the inner side.

Figure 4 is a fragmentary sectional view illustrating the advancing mechanism, and Figure 5 is a fragmentary detail showing the pawl.

Referring more particularly to the drawings, it will be seen that the device comprises a body member or arched plate 1, which is provided with inwardly projecting lugs 2. Grooved rollers 3 are revolubly mounted upon the under side of these lugs and are adapted to engage the inner edge of one of the flanges 4 of the rim 5. This body member is provided upon its under side with an angularly bent lever 6 pivotally joined to the body member by means of a pin or rivet 7. A pawl 8 is pivoted at 9 to an intermediate portion of the lever and is provided with a forked extremity having an upwardly and a downwardly extending portion, indicated respectively by the numerals 10 and 11. An operating handle 12 is provided for the lever 6 and is equipped with a socket 13 adapted to receive the outwardly projecting end of the lever.

The upper side of the body member or plate 1 is provided with a diagonally arranged guide 14 riveted thereto and occupying approximately the position illustrated in Figure 2. If desired, a roller 15 may be mounted at the forward edge of the device.

The operation of the device is as follows:—The tire 16 is positioned upon the rim with one of its sides 17 in engagement with the flange 4 of the rim. The device is then placed upon the rim in the position shown, with the rollers 3 in engagement with the inner side of one of the flanges 4 of the rim. The free side 18 of the tire is positioned upon the inner side of the guide 14 in the manner shown in Figure 1, and the handle or lever 12 is oscillated. This causes the pawl 8 to grip the flange 4 of the rim and move the device along the rim in a step by step manner, the side 18 of the tire riding over the roller 15 and being forced inwardly by the diagonal guide 14.

It will be seen, therefore, that by simple manipulation of the lever, the entire rim of the wheel will be traversed and the tire will be forced into position.

It will be further seen that the device is simple in construction and may be cheaply made and may be stored in a relatively small space, as the handle or lever 12 may be detached from the relatively short lever 6 when the device is not in use.

I claim:—

1. A device for placing clincher tires upon the flanged rims of wheels comprising a body portion, means carried by said body portion for engaging the inner side of a flange of the rim, a diagonal guide carried by the upper side of said body portion and adapted to bear against and force one side of the tire inwardly, a lever pivoted to said body portion, and a pawl for intermittently operatively coupling said rim and lever.

2. A device for placing clincher tires upon the flanged rims of wheels comprising an arched plate adapted to rest upon a flange of the rim, a pair of rollers projecting downwardly from the under side of said plate and adapted to engage the inner side of said flange, a lever pivoted to said plate, a pawl pivoted to said lever and adapted to engage said flange, and a diagonal guide carried upon the upper side of said plate and adapted to bear against and force one side of the tire inwardly.

In testimony that we claim the foregoing we have hereunto set our hands at Denmark, in the county of Manitowoc and State of Wisconsin.

ANTON F. MELICHAR.
LEO PAETZ.